ated under 35

United States Patent
Kaufman et al.

(10) Patent No.: US 10,206,056 B2
(45) Date of Patent: *Feb. 12, 2019

(54) ACCESS TO MOBILE LOCATION RELATED INFORMATION

(71) Applicants: AT&T Mobility II LLC, Atlanta, GA (US); AT&T INTELLECTUAL PROPERTY I, L.P., Atlanta, GA (US)

(72) Inventors: David Kaufman, Atlanta, GA (US); Andrew Eberhart, Woodstock, GA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,220

(22) Filed: Apr. 18, 2016

(65) Prior Publication Data

US 2016/0261981 A1 Sep. 8, 2016

Related U.S. Application Data

(63) Continuation of application No. 14/641,247, filed on Mar. 6, 2015, now Pat. No. 9,351,111.

(51) Int. Cl.
*H04W 4/02* (2018.01)

(52) U.S. Cl.
CPC .................................. *H04W 4/02* (2013.01)

(58) Field of Classification Search
CPC ...... H04W 4/12; H04W 4/14; G06Q 30/0267; G06Q 30/0251; G06Q 30/0259; G06Q 30/0261

(Continued)

(56) References Cited

U.S. PATENT DOCUMENTS

| 4,718,081 | A | 1/1988 | Brenig |
| 5,515,062 | A | 5/1996 | Maine et al. |

(Continued)

FOREIGN PATENT DOCUMENTS

| EP | 0856746 A2 | 8/1998 |
| EP | 1145526 | 10/2001 |

(Continued)

OTHER PUBLICATIONS

Notice of Allowance dated Aug. 12, 2013, for U.S. Appl. No. 13/174,541, 40 pages.

(Continued)

*Primary Examiner* — Marcus Hammonds
(74) *Attorney, Agent, or Firm* — Amin, Turocy & Watson, LLP

(57) ABSTRACT

Access to location information related to mobile devices is disclosed. A component can receive a subscription request related to returning location related data associated with a set of network event locating system (NELOS) information. NELOS information can be received from a NELOS component and can be derived from timed fingerprint location (TFL) information associated with a user equipment (UE). TFL information and NELOS information can be distinct from location information determined from conventional techniques, which can provide for additional benefit. The subscription request can indicate continuing access to location information without subsequent requests. Moreover, access can be via a push of information to a subscribing device.

20 Claims, 10 Drawing Sheets

(58) Field of Classification Search
USPC .................. 455/456.1–457; 705/14.49–14.65
See application file for complete search history.

(56) References Cited

U.S. PATENT DOCUMENTS

| | | | |
|---|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Chrichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B1 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,437,790 B1 | 5/2013 | Hassan et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,768,348 B2 | 7/2014 | Stuempert et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,928,927 B2 | 1/2015 | Fix et al. |
| 9,008,684 B2 | 4/2015 | Tipton et al. |
| 9,008,698 B2 | 4/2015 | Meredith et al. |
| 9,066,227 B2 | 6/2015 | Spencer et al. |
| 9,232,399 B2 | 1/2016 | Tipton et al. |
| 9,667,660 B2 | 5/2017 | Tipton et al. |
| 10,084,824 B2 | 9/2018 | Tipton et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |

(56) References Cited

U.S. PATENT DOCUMENTS

| | | |
|---|---|---|
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0143292 A1 | 6/2006 | Taubenheim et al. |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0163632 A1 | 7/2010 | Tseng et al. |
| 2010/0172259 A1 | 7/2010 | Aggarwal et al. |
| 2010/0180039 A1* | 7/2010 | Oh .................. H04W 4/02 709/228 |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0028129 A1 | 2/2011 | Hutchison et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |

(56) References Cited

U.S. PATENT DOCUMENTS

| | | |
|---|---|---|
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1* | 6/2012 | Dyor .................. H04L 63/0884 726/4 |
| 2012/0144457 A1 | 6/2012 | Counterman |
| 2012/0158289 A1 | 6/2012 | Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0276900 A1 | 11/2012 | Stephens et al. |
| 2012/0286997 A1 | 11/2012 | Lin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1* | 5/2013 | Tipton .................. H04W 12/08 455/456.2 |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0150053 A1 | 6/2013 | Hwang et al. |
| 2013/0226451 A1 | 8/2013 | O'Neill et al. |
| 2013/0267242 A1 | 10/2013 | Curticapean et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1* | 10/2014 | Werner .................. H04W 4/023 455/456.1 |
| 2014/0365488 A1 | 12/2014 | Arslan et al. |
| 2015/0011249 A1 | 1/2015 | Siliski et al. |
| 2015/0098712 A1 | 4/2015 | Li et al. |

FOREIGN PATENT DOCUMENTS

| | | |
|---|---|---|
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

Office Action dated Aug. 2, 2013, for U.S. Appl. No. 13/188,295, 26 pages.

Office Action dated Aug. 2, 2013, for U.S. Appl. No. 13/188,300, 38 pages.

Office Action dated Jun. 20, 2013, for U.S. Appl. No. 13/219,911, 61 pages.

Office Action dated Jul. 17, 2013, for U.S. Appl. No. 13/188,345, 27 pages.

Office Action dated Jun. 20, 2013, for U.S. Appl. No. 13/291,917, 52 pages.

Office Action dated May 31, 2013, for U.S. Appl. No. 13/523,770, 40 pages.

Office Action dated Sep. 19, 2013, for U.S. Appl. No. 13/927,020, 30 pages.

Office Action dated Oct. 2, 2013 for U.S. Appl. No. 12/958,146, 31 pages.

Office Action dated Sep. 26, 2013 for U.S. Appl. No. 13/284,456, 58 pages.

RouteFinder 3.00 for ArGIS Documentation, 2007, Routeware and Higher Mapping Solutions, 71 pages, downloaded from http://www.routeware.dk/download/routefinder_arcgis.pdf.

MySociety (Web page), "More travel-time maps and their uses", 2007, downloaded from http://www.mySociety.org/2007/more-travel-maps/, 10 pages total (including a single page Examiner's attachment showing the operation of Ihe interactive travel-time map).

Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.

Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.

Office Action dated Nov. 5, 2013 for U.S. Appl. No. 13/188,136, 47 pages.

Office Action dated Sep. 18, 2013, for U.S. Appl. No. 13/284,497, 30 pages.

Office Action dated Aug. 22, 2013, for U.S. Appl. No. 13/277,595, 36 pages.

Office Action dated Oct. 21, 2013, for U.S. Appl. No. 13/523,770, 24 pages.

Office Action dated Nov. 5, 2013 for U.S. Appl. No. 13/188,345, 30 pages.

Office Action dated Dec. 11, 2013, for U.S. Appl. No. 13/188,295, 52 pages.

Office Action dated Dec. 24, 2013, for U.S. Appl. No. 13/188,300, 44 pages.

Office Action dated Dec. 11, 2013, for U.S. Appl. No. 13/291,917, 34 pages.

Office Action dated Jan. 15, 2014 for U.S. Appl. No. 13/219,911, 38 pages.

Office Action dated Jan. 28, 2014, for U.S. Appl. No. 12/958,146, 24 pages.

Notice of Allowance dated Feb. 14, 2014 for U.S. Appl. No. 13/284,456, 30 pages.

Office Action dated Feb. 24, 2014, for U.S. Appl. No. 13/927,020, 18 pages.

Office Action dated May 21, 2013 for U.S. Appl. No. 13/305,276, 28 pages.

Office Action dated Oct. 24, 2012 for U.S. Appl. No. 13/305,276, 37 pages.

(56) References Cited

OTHER PUBLICATIONS

"Locate your friends in real time with Google Latitude." http://googlemobile.blogspot.com/2009/02/locate-your-friends-in-real-time-with.html. Last accessed Mar. 8, 2012, 23 pages.

"Location sharing and updating." http://support.google.com/mobile/bin/answer.py?hl=en&answer=136647. Last accessed Mar. 8, 2012, 3 pages.

"Privacy Settings." http://support.google.com/mobile/bin/answer.py?hl=en&answer=136650, Last accessed Mar. 8, 2012, 1 page.

Office Action dated Nov. 25, 2013 for U.S. Appl. No. 13/447,069, 40 pages.

Office Action dated May 9, 2013 for U.S. Appl. No. 13/447,069, 33 pages.

Tsai, et al, "Location-Sharing Technologies: Privacy Risks and Controls." Feb. 2010. Retrieved on May 10, 2013, 26 pages.

Li et al, "Sharing Location in Online Social Networks". IEEE Network, Sep./Oct. 2010; 0890-8044/10/$25.00 (c)2010 IEEE. Retrieved on May 10, 2013, 6 pages.

Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.

Pettersen, et al., "Automatic antenna tilt control for capacity enhancement in UMTS FDD." Retrieved on Mar. 25, 2012, 5 pages.

Islam, et al., "Self-Optimization of Antenna Tilt and Pilot Power for Dedicated Channels." Retrieved on Mar. 25, 2012, 8 pages.

Bigham, et al., "Tilting and Beam-shaping for Traffic Load Balancing in WCDMA Network." Retrieved on Mar. 25, 2012, 4 pages.

3GPP TS 25.215 V6.4.0 (Sep. 2005) Physical Layer Measurements, Sep. 2005.

3GPP TS 25.331 V6.9.0 (Mar. 2006) RRC protocol for the UE-UTRAN radio interface, Mar. 2006.

3GPP TS 25.413 V6.9.0 (Mar. 2006) UTRAN Iu interface RANAP signalling, Mar. 2006.

Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.

Smith, et al., "Airsage Overview", (http://mikeontraffic.typepad.com/files/raleigh-winter-2011-presentation-v11-final.pdf) Retrieved on Sep. 29, 2012, 39 pages.

Office Action dated Feb. 5, 2014 for U.S. Appl. No. 13/526,988, 56 pages.

Marko Silventoinen, Timo Rantalainen, "Mobile Station Locating in GSM" Helsinki, Finland, Last accessed on Nov. 15, 2011, 7 pages.

Office Action dated Dec. 30, 2013 for U.S. Appl. No. 13/305,267, 10 pages.

Office Action dated Mar. 25, 2014 for U.S. Appl. No. 13/488,144, 60 Pages.

Interview Summary dated Feb. 3, 2014 for U.S. Appl. No. 13/188,136, 10 pages.

Rabinowitz, et al., A new positioning system using television synchronization signals, IEEE Transactions on Broadcasting, vol. 51(1), p. 51-61, Mar. 2005.

Notice of Allowance dated Aug. 21, 2014 for U.S. Appl. No. 13/447,069, 78 pages.

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

Office Action dated Aug. 11, 2014 for U.S. Appl. No. 14/279,176, 22 pages.

Office Action dated Nov. 14, 2014 for U.S. Appl. No. 13/277,595, 74 pages.

Notice of Allowance dated Nov. 20, 2014 for U.S. Appl. No. 13/866,909, 27 pages.

Notice of Allowance dated Dec. 9, 2014 for U.S. Appl. No. 12/958,146, 48 pages.

Office Action dated Dec. 11, 2014 for U.S. Appl. No. 13/447,072, 28 pages.

Office Action dated Dec. 1, 2014 for U.S. Appl. No. 13/495,756, 76 pages.

Office Action dated Jan. 7, 2015 for U.S. Appl. No. 13/557,425, 30 pages.

Notice of Allowance dated Jan. 21, 2015 for U.S. Appl. No. 13/495,391, 98 pages.

Notice of Allowance dated Feb. 6, 2015 for U.S. Appl. No. 13/204,535, 20 pages.

Office Action dated Feb. 13, 2015 for U.S. Appl. No. 14/516,286, 62 pages.

Girardin, et al., "Digital footprinting: Uncovering tourists with user generated content." Pervasive Computing, IEEE 7.4, Oct.-Nov. 2008. 8 pages.

Steinfield, "The development of location based services in mobile commerce." ELife after the Dot Com Bust. PhysicaVerlagHD, 2004. 15 pages.

Sevtsuk, et al., "Does urban mobility have a daily routine? Learning from the aggregate data of mobile networks." Journal of Urban Technology, vol. 17, No. 1, Apr. 2010: 20 pages.

Buhalis, et al., "Information communication technology revolutionizing tourism." Tourism Recreation Research, vol. 30, No. 3, 2005. 10 pages.

Ratti, et al. "Mobile Landscapes: using location data from cell phones for urban analysis." Environment and Planning B: Planning and Design, vol. 33, 2006, 23 pages.

Office Action dated Sep. 14, 2015 for U.S. Appl. No. 13/557,425, 32 pages.

Office Action dated Apr. 16, 2015 for U.S. Appl. No. 14/521,431, 82 Pages.

Notice of Allowance dated Mar. 19, 2015 for U.S. Appl. No. 13/494,959, 41 Pages.

Notice of Allowance dated Mar. 26, 2015 for U.S. Appl. No. 14/276,688, 75 pages.

Office Action dated May 1, 2015 for U.S. Appl. No. 13/557,425, 33 pages.

Office Action dated May 14, 2015 for U.S. Appl. No. 14/530,605, 72 pages.

Office Action dated Jun. 1, 2015 for U.S. Appl. No. 13/447,072, 38 pages.

Office Action dated Jun. 2, 2015 for U.S. Appl. No. 14/516,286, 20 pages.

Office Action dated May 20, 2015 for U.S. Appl. No. 13/526,988, 52 pages.

Office Action dated Jun. 9, 2015 for U.S. Appl. No. 13/495,756, 35 pages.

Notice of Allowance dated Jul. 8, 2015 for U.S. Appl. No. 14/548,901, 125 pages.

Buford, et al, "Location Privacy Enforcement in a Location-Based Services Platform," IEEE, 2009, 5 pages.

Phillips, Jr., et al., "Information Sharing and Security in Dynamic Coalitions," ACM, 2002, pp. 87-96, 10 pages.

Moniruzzaman, et al., "A Study of Privacy Policy Enforcement in Access Control Models", Proceedings of 13th International Conference on Computer and Information Technology IEEE, 2010, pp. 352-357, 6 pages.

Office Action dated Jul. 22, 2015 for U.S. Appl. No. 13/188,136, 31 Pages.

"CELL_DCH", in INACON Glossary, published online at [http://www.inacon.de/glossary/CELL_DCH.php] retrieved on Jul. 22, 2015, 1 page.

Office Action dated Sep. 17, 2015 for U.S. Appl. No. 13/495,756, 23 Pages.

Office Action dated Sep. 18, 2015 for U.S. Appl. No. 14/641,247, 69 Pages.

(56) References Cited

OTHER PUBLICATIONS

Notice of Allowance dated Aug. 27, 2015 for U.S. Appl. No. 14/521,431, 39 Pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action dated Dec. 18, 2015 for U.S. Appl. No. 14/548,901, 35 pages.
Office Action dated Dec. 31, 2015 for U.S. Appl. No. 14/952,609, 32 pages.
Office Action dated Dec. 1, 2015 for U.S. Appl. No. 13/526,988, 43 pages.
Office Action dated Nov. 30, 2015 for U.S. Appl. No. 13/447,072, 45 pages.
Office Action dated Jan. 11, 2016 for U.S. Appl. No. 13/175,199, 29 pages.
Notice of Allowance dated Jul. 19, 2016 for U.S. Appl. No. 14/952,609, 99 pages.
Office Action dated Aug. 24, 2016 for U.S. Appl. No. 14/676,066, 107 pages.
Office Action dated Aug. 25, 2016 for U.S. Appl. No. 13/447,072, 38 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary? doi=10.1.1.21.3818. Last accessed Dec. 24, 2010, 9 pages.
Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.
Drucker, et al. Support Vector Regression Machines.http://scholar.google.com/scholar?q=%22Support+Vector+Regression+Machines.%22. Last accessed Dec. 24, 2010, 7 pages.
Suykens, et al., "Least squares support vector machine classifiers", Neural Processing Letters, vol. 9, No. 3, Jun. 1999, pp. 293-300.

Ferris, et al. (2002). "Interior-point methods for massive support vector machines". SIAM Journal on Optimization 13: 783-804. doi:10.1137/S1052623400374379.
Meyer, et al "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011, 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, retrieved on Aug. 15, 2011, 7 pages.
Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.
Bitcarrier Technology. Published online at http://www.bitcarrier.com/technology, retrieved on Aug. 15, 2011, 1 page.
Hao Peng, Ban Xuegang(Jeff). Estimating Vehicle Position in a Queue at Signalized Intersections Using Simple Travel Times from Mobile Sensors, retrieved Nov. 28, 2011. 6 pages.
Ban Xuegang(Jeff), Gruteser Marco. Mobile Sensor as Traffic Probes: Addressing Transportation Modeling and Privacy Protection in an Integrated Framework, dated Jan. 10, 2010, 17 pages.
Office Action for U.S. Appl. No. 12/836,471 dated Dec. 28, 2011, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.

(56) References Cited

OTHER PUBLICATIONS

Office Action dated Jan. 3, 2013 for U.S. Appl. No. 13/188,300, 36 pages.
Office Action dated Nov. 8, 2012 for U.S. Appl. No. 13/204,535, 30 pages.
Office Action dated Jan. 25, 2013, for U.S. Appl. No. 13/554,285, 20 pgs.
Office Action dated Mar. 19, 2013, for U.S. Appl. No. 13/174,541, 46 pgs.
Office Action dated Feb. 13, 2013, for U.S. Appl. No. 13/220,083, 48 pgs.
Office Action dated Feb. 22, 2013, for U.S. Appl. No. 13/188,345, 45 pgs.
Office Action dated Mar. 15, 2013, for U.S. Appl. No. 13/204,535, 18 pgs.
Office Action dated Mar. 19, 2013, for U.S. Appl. No. 13/284,497, 46 pgs.
Office Action dated Apr. 19, 2013, for U.S. Appl. No. 13/277,595, 58 pages.
Office Action dated Sep. 30, 2016 for U.S. Appl. No. 14/957,525, 72 pages.
Notice of Allowance dated Oct. 7, 2016 for U.S. Appl. No. 14/548,901, 45 pages.
Office Action dated Oct. 12, 2016 for U.S. Appl. No. 14/877,915, 34 pages.
Notice of Allowance dated Nov. 16, 2016 for U.S. Appl. No. 15/186,410, 80 pages.
Office Action dated Dec. 28, 2016 for U.S. Appl. No. 13/447,072, 34 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/0.
Represent. (2011). In The American heritage dictionary of the English language. Retrieved on May 9, 2014 from http://search.credoreference.com/content/entry/hmdictenglang/represent/0.
Office Action dated May 20, 2014 for U.S. Appl. No. 13/551,369, 29 pages.
Office Action dated May 30, 2014 for U.S. Appl. No. 13/277,595, 49 pages.
Office Action dated Jun. 3, 2014 for U.S. Appl. No. 13/523,770, 53 pages.
Office Action dated Jun. 6, 2014 for U.S. Appl. No. 13/447,072, 25 pages.
Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Jun. 10, 2016 for U.S. Appl. No. 14/548,901, 33 pages.
Office Action dated Jun. 22, 2016 for U.S. Appl. No. 14/970,533, 84 pages.
Office Action dated Jan. 13, 2017 for U.S. Appl. No. 14/601,800, 95 pages.
Office Action dated Jan. 26, 2017 for U.S. Appl. No. 14/877,915, 20 pages.
Office Action dated Feb. 14, 2017 for U.S. Appl. No. 14/641,242, 120 pages.
Office Action dated Feb. 15, 2017 for U.S. Appl. No. 15/191,877, 104 pages.
Notice of Allowance dated Apr. 10, 2017 for U.S. Appl. No. 14/676,066, 33 pages.
Office Action dated Jul. 5, 2017 for U.S. Appl. No. 15/191,877, 32 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Office Action dated Jun. 19, 2017 for U.S. Appl. No. 13/447,072, 47 pages.
Office Action dated Jul. 25, 2017 for U.S. Appl. No. 15/422,147, 86 pages.
Office Action dated Aug. 24, 2017 for U.S. Appl. No. 14/881,335, 125 pages.
Notice of Allowance dated Aug. 16, 2017 for U.S. Appl. No. 14/877,915, 63 pages.
Office Action dated Oct. 4, 2017 for U.S. Appl. No. 15/235,502, 80 pages.
Office Action dated Sep. 28, 2017 for U.S. Appl. No. 15/344,468, 107 pages.
Office Action dated Oct. 18, 2017 for U.S. Appl. No. 15/629,366, 131 pages.
Office Action dated Oct. 16, 2017 for U.S. Appl. No. 15/131,793, 84 pages.
Office Action dated Nov. 15, 2017 for U.S. Appl. No. 15/191,877, 30 pages.
Office Action dated Jan. 24, 2018 for U.S. Appl. No. 15/603,416, 99 pages.
Office Action dated Feb. 13, 2018 for U.S. Appl. No. 14/881,335, 54 pages.
Office Action dated Mar. 30, 2018 for U.S. Appl. No. 15/235,502, 14 pages.
Office Action dated Mar. 27, 2018 for U.S. Appl. No. 15/629,366, 23 pages.
Office Action dated May 2, 2018 for U.S. Appl. No. 14/704,949, 95 pages.
Office Action dated May 30, 2018 for U.S. Appl. No. 15/629,366, 30 pages.
Office Action dated May 31, 2018 for U.S. Appl. No. 15/603,421, 90 pages.

(56) References Cited

OTHER PUBLICATIONS

Office Action dated May 29, 2018 for U.S. Appl. No. 14/881,335, 63 pages.
Office Action dated Jun. 13, 2018 for U.S. Appl. No. 15/191,877, 33 pages.
Notice of Allowance dated May 21, 2018 for U.S. Appl. No. 15/344,468, 45 pages.
Office Action dated Nov. 27, 2018 for U.S. Appl. No. 15/629,366, 35 pages.
Non-Final Office Action dated Aug. 27, 2018 for U.S. Appl. No. 16/006,942, 24 pages.
Ouyang, Y. & Fallah, M. H., "The Impact of Cell Site Re-homing on the Performance of UMTS Core Networks", International Journal of Next Generation Network (IJ NGN), vol. 2, No. 1, Mar. 2010.
Office Action dated Nov. 19, 2018 for U.S. Appl. No. 16/108,060, 27 pages.
Notice of Allowance dated Oct. 19, 2018 for U.S. Appl. No. 14/704,949, 24 pages.
Office Action dated Nov. 08, 2018 for U.S. Appl. No. 14/881,335, 68 pages.

* cited by examiner

ACCESS TO MOBILE LOCATION RELATED INFORMATION

CROSS REFERENCE TO RELATED APPLICATION

This application is a continuation of, and claims priority to, U.S. patent application Ser. No. 14/641,247 (now U.S. Pat. No. 9,351,111), filed on 6 Mar. 2015, and entitled "ACCESS TO MOBILE LOCATION RELATED INFORMATION," the entirety of which application is hereby incorporated by reference herein.

TECHNICAL FIELD

The disclosed subject matter relates to facilitating access to location information related to mobile devices, including sourcing location information related to mobile devices to a third party device in response to an agreement made between a provider device and a subscriber device.

BACKGROUND

By way of brief background, mobile location information can be a highly valued data component for a multitude of applications. Mobile location information can be leveraged to facilitate delivery of real-time advertising, notifications, to establish behavior patterns of individuals, aggregated into anonymized data sets for optimal placement of infrastructure and/or services, for law enforcement purposes, etc. Conventional network location technologies can generally be associated with limitations, such as being limited to a particular carrier, particular device type, or require rollout of additional infrastructure, etc., that can, for example, limit success rates to anywhere between about 15% to 80%. This broad range of possible failures, e.g., an about 20% to 85% failure rate based on the about 15-80% success rate, for capturing relevant location data can be a significant cause of uncertainty among consumers of such location information, e.g., the significant uncertainty can impact pricing, confidence, or reliance on conventionally ascertained location information. As an example, where location data for a region is requested from a carrier, the successful return of location data for all mobile devices in that region can be limited by the percentage of customers using the carrier as opposed to other carriers. The successful return of location data can further be limited in the example for devices also needing to be enabled for the location technology being employed, as opposed to older devices that may not have said location technology. Moreover, the successful return of location data can also be further limited by the scope of infrastructure the example carrier has rolled out to actually capture potential location information. Other deficiencies of conventional location information technologies may become apparent from the description of the various embodiments of the subject application below.

DETAILED DESCRIPTION

Figure 1:
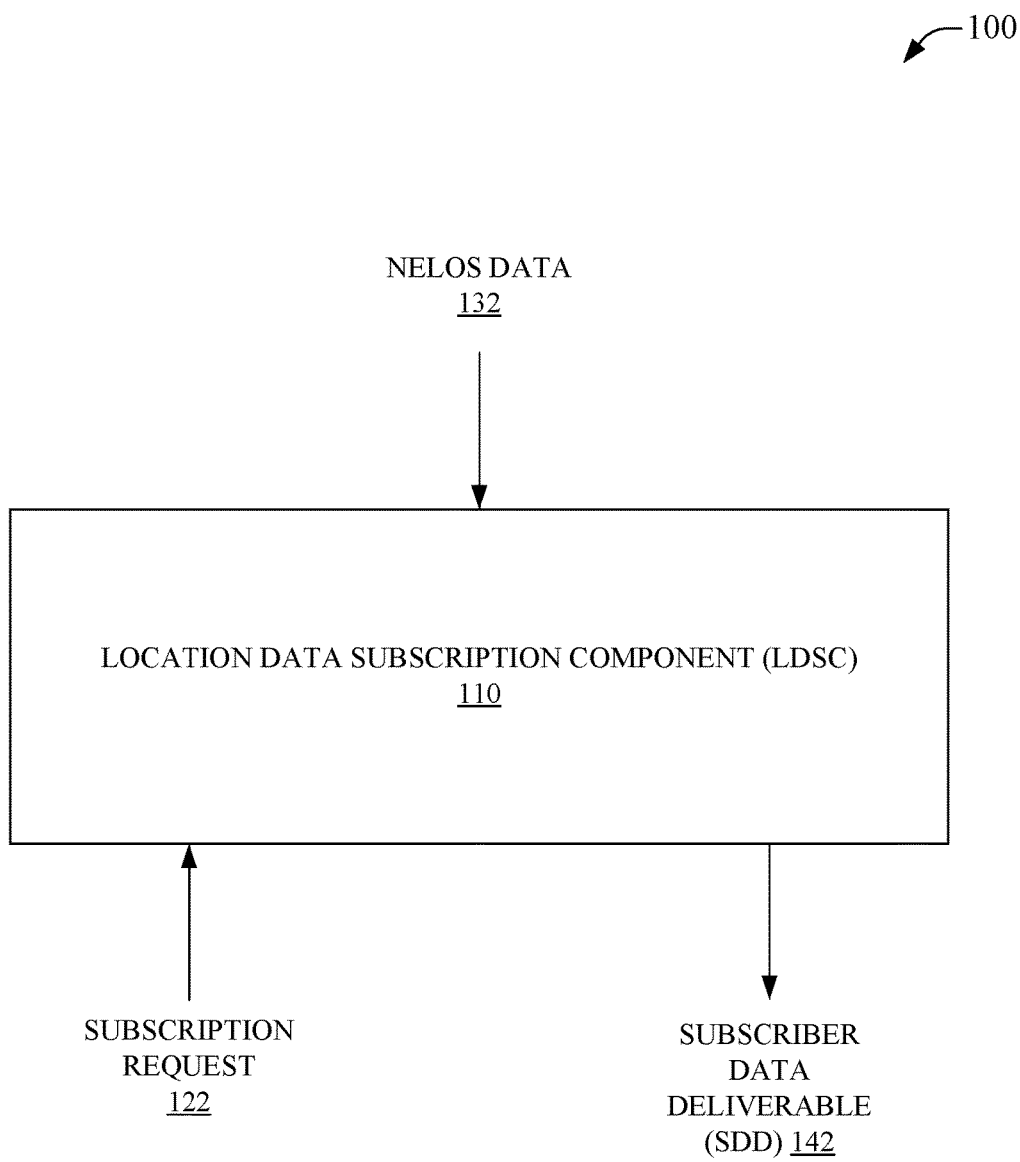
FIG. 1 is an illustration of an example system that facilitates access to mobile device location information in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional network location technologies can be associated with notable limitations, e.g., particular carrier, particular device type, supporting infrastructure, etc. A lack of third party consumer confidence in the reliability of mobile location information can affect the consumption of such information by a third party consumer. Improvements in the mobile location information technology can greatly improve on conventional technologies.

In contrast to conventional network location technologies, the instant disclosure can provide for near real time access to location records that can be device/carrier agnostic. Additionally, in some embodiments, location related information can be pushed out to a third party as the information becomes available, thereby reducing the need for the third party to make multiple requests for location related data.

Some embodiments can incorporate rules that facilitate access to location information of mobile devices in an idle state, which can provide rich context with regard to the location of a mobile device without significantly taxing the resources of the mobile device as might be expected in conventional technologies.

Additional embodiments can apply rules to enable control of data capture, data analysis, and subscription management, for indicated mobile device identities. As an example, where a third party subscriber identifies a plurality of mobile devices for which location related information is desired, rules can be applied that can apply to all, some, one, or none of the plurality of mobile devices, e.g., a first rule can request that location information for all devices be provided at least hourly, a second rule can request that location information within a determined distance of a locus be provided as soon as possible, and a third rule can request that mobile device identities associated with a user age value of less than 18 years be withheld, etc. Depending on how the first, second, third rule, etc., are organized, these rules can result in access to different data packages for the third party subscriber according to the goals of the third party subscriber.

In some embodiments, location data subscription components can be integrated into carrier-side equipment or devices. In other embodiments, location data subscription components can be operated on non-carrier controlled equipment or devices. As an example, a location data subscription components can be part of a carrier gateway device, a carrier server, a carrier NodeB, etc. As another example, a location data subscription components operated in a virtual machine in a cloud environment, operate on a non-carrier corporate server, on a mobile virtual network operator (MVNO) gateway, etc.

Certain embodiments of the disclosed subject matter can provide for interaction with a UE location data source to provide for some aspects of the instant disclosure. As an example, a UE can receive instructions or a rule directing that the UE cache idle-state timing information such that this idle-state information can be communicated when the UE is in a future active-state. As another example, loci can be provided to the UE along with a rule indicating that the UE should enter an active-state when the UE position satisfies a rule related to a locus of the loci. As a further example, a UE can receive a rule requesting that location information be provided in conjunction with an event, date, time, location, state transition, device parameter such as battery level, processor usage, available memory, etc., weather condition, use of an application on the UE, schedule, etc.

It will be noted that the use of the terms "location", "location data", or other similar terms, can expressly include information identifying a location, region, area, etc., timing information related to determining a location, additional information in addition to a location or timing information, such as a time stamp, accuracy indicator, identifier(s), longitude/latitude/altitude, distance, proximity, beacon identities, images, sounds, motion, device parameters, etc., or derivatives of location or timing information such as direction of travel, speed, altitude, proximity, distance, mode or travel, moving or stopped time, etc., and, as such, should be generally treated broadly unless they are explicitly or inherently used in narrow manner. Moreover, it will be further noted that the terms "location", "location data", or other similar terms, as used herein, can expressly include timed fingerprint location (TFL) information, network event locating system (NELOS) information, and other similar types of information. Similarly, the terms "TFL", "TFL information", "NELOS", "NELOS information", or similar terms as used herein can expressly include location, location data, or the like.

TFL information can include location information or timing information related to determining a location. As such, a TFL component or NELOS component can facilitate access to location information for a UE, and TFL information can be information from systems in, or associated with, a timed fingerprint location wireless environment, such as a TFL component of a wireless telecommunications carrier, a NELOS component, etc. As a non-limiting example, a mobile device, including mobile devices not equipped with a GPS-type system, can be located by looking up timing information associated with the mobile device from a TFL information component or NELOS component.

In an aspect, TFL information can include information related to determining a differential value for a NodeB site pair and a bin grid frame of a bin grid frame array. A centroid region, e.g., possible locations between a NodeB site pair, for an observed time value associated with the NodeB site pair (NBSP) can be calculated and is related to a determined value, e.g., in units of chip, from the pair of NodeBs. When UE time data is accessed, a value look-up can be initiated, e.g., a lookup for "DV(?,X)". Relevant NBSPs can be prioritized as part of the look-up event. Further, the relevant NBSPs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can, for example, return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to narrow the possible locations of the UE further by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors. TFL information can be employed for mobile devices in active states, and in some embodiments, can also be employed for mobile device in idle states.

In an aspect, TFL information can be particularly well suited to location analytic technologies in that TFL information lookup generally requires less computation that other location technologies. For example, in conventional multilateration systems, complex math is typically employed to convert a plurality of measured signals into a location. In contrast, TFL information is generally pre-computed and could employ simple lookup techniques to garner probable locations of a UE based on overlapping bin grid locations for a plurality of NodeB Site Pairs (NBSPs). Moreover, timing signals can be captured by a UE between active connections to a carrier to allow location histories, e.g., via historical TFL information on the UE, of devices with less consumption of network resources, battery power, etc.

In a further aspect, TFL information can be acquired based on timing signals already being received by a typical UE and, as such, additional power need not typically be expended, for example, on an additional radio receiver as would be common in more conventional location technologies such as GPS, in going active for conventional technologies such as trilateration/triangulation, etc. As an example, in contrast to a GPS system having a GPS receiver to receive GPS signals, a TFL enabled smartphone can employ wireless radio timing signals already associated with the wireless cellular service of the smartphone to determine location such that both location information and cellular service are accommodated on the same radio and additional energy for a second radio need not be expended. As such, TFL information can be well suited to portable user equipment that typically is both highly power conscious and relatively processor limited as compared to their non-mobile counterparts. It is to be appreciated that where the location of a mobile device can be achieved with TFL information without bogging down a processor or further increasing battery depletion in the mobile device, the use of TFL information is well suited for location analytics related to a mobile device.

In an embodiment, a system can comprise a processor and memory to facilitate performance of operations comprising receiving a request for mobile device location information from a subscribing device associated with a subscriber entity. In response to receiving NELOS information related to a location of a mobile device, access to the location data can be facilitated. This can be based on a parameter of the request satisfying a rule related to permission to access the location data.

In another embodiment, a method can comprise receiving a subscription request from a subscribing device. NELOS information related to a location of a US can also be received. The subscribing device can access a data deliverable comprising information related to the NELOS information based on the subscription request.

In a further embodiment, a computer readable storage device can comprise instructions for receiving a request for mobile device location information from a subscribing device associated with a subscriber identity. Further, NELOS information related to a location of a mobile device can also be received. Location data can be generated in response to an analysis of the NELOS information based on the request. The location data can be shared with the subscribing device.

In an aspect, while terms like "user equipment (UE)," "mobile station," "mobile," subscriber station," "subscriber equipment," "access terminal," "terminal," "handset," and similar terminology, can conventionally refer to a wireless device utilized by a wireless services subscriber or user of a wireless communication service to receive or convey data, control, voice, video, sound, gaming, or substantially any data-stream or signaling-stream, in instances where there are multiple types of subscriptions, the terms can also refer to aspects of each subscription service. As an example, where a UE accesses a wireless cellular service according to a subscription with a wireless cellular carrier, this can be accomplished via a femtocell that harvests metadata for a remotely located device according to a subscription with the manufacturer of the femtocell. In this example, there is a UE that is a subscriber device of the wireless cellular service and another subscriber device, i.e., the remote device, subscribing to a service of the femtocell manufacturer. As such, it will be noted, that the term subscribing device, as used herein, can generally refer to a mobile device or UE, e.g., UE 250, 350, 450, etc., subscribing to a mobile carrier service and/or, as dictated by context, can refer to other devices that subscribe to location services as provided in the context of the currently disclosed subject matter, e.g., devices, such as $3^{rd}$ party component 220, etc., accessing SDD 142, 242, etc. as disclosed in more detail herein below.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates access to mobile device location information in accordance with aspects of the subject disclosure. System 100 can comprise location data subscription component (LDSC) 110. LDSC 110 can receive subscription request 122. Subscription request 122 can comprise a parameter related to subscriber data deliverable (SDD) 142, such as frequency of reporting, a reporting trigger such as an event, proximity, time, identifier(s), etc., a type of returned data such as location, timing information, derivatives of location or timing information, etc., price, device, age, etc. LDSC 110 can further receive NELOS data 132 which can comprise location data related to a mobile device or other UE. LDSC 110 can facilitate access to SDD 142 based on NELOS data 132 and subscription request 122. SDD 142 can comprise a location, location data, TFL information, NELOS information, derivatives thereof, or other related information.

In an embodiment, LDSC 110 can receive a location or location data, e.g., via NELOS data 132, from a UE. NELOS data 132 can be received from a NELOS component, e.g., NELOS component 230 in FIG. 2, etc., from a UE directly, or via another component such as a data store, cloud environment device, etc. NELOS data 132 can comprise TFL or TFL information. As such, NELOS data 132 can comprise near real time location or location data, historical location or location data, cached location or location data, etc. The particulars of capturing, determining, or generating TFL, TFL information, or NELOS information is outside of the scope of the instant disclosure except where more particularly pointed out herein and to note that these types of location related information, e.g., TFL information, etc., are distinct from more conventional types of location related information, such as that from GPS, triangulation, trilateration, beacon ranging, etc. As such, the use of TFL, TFL information, NELOS information, NELOS technology, etc., in combination with the instant disclosure provides advantages over conventional technologies, such as, being device/provider independent, information sourcing that can consume less power and/or can consume fewer network resources, etc.

In an aspect, NELOS data 132 can be processed at LDSC 110 to generate SDD 142 that can then be made accessible to other components or devices. In an embodiment, NELOS data 132 can be passed as SDD 142 without change where no change is indicated in the analysis of NELOS data 132 in view of subscription request 122, e.g., where subscription request 122 indicates that SDD 142 should comprise all NELOS data 132, then SDD 142 can be the same as NELOS data 132. In other embodiments, NELOS data 132 can be processed, analyzed, etc., such that SDD 142 comprises information derived from NELOS data 132, e.g., SDD 142 is not the same as NELOS data 132. As an example, where LDSC 110 analyzes NELOS data 132 and determines that it comprises private information, this private information can be stripped out and the balance of the information can be made available as SDD 142. As another example, LDSC 110 can receive NELOS data 132 comprising timing information and can convert the timing information to location information such that SDD 142 comprises location information rather than timing information. In a further example, LDSC 110 can receive NELOS data 132 comprising information from a plurality of UEs and an aggregate elements of this information to include in SDD 142, such as where such aggregating is indicated in subscription request 122. Numerous other examples are readily appreciated, and although not recited herein for the sake of brevity, such examples are to be considered within the scope of the instant disclosure.

Figure 2:
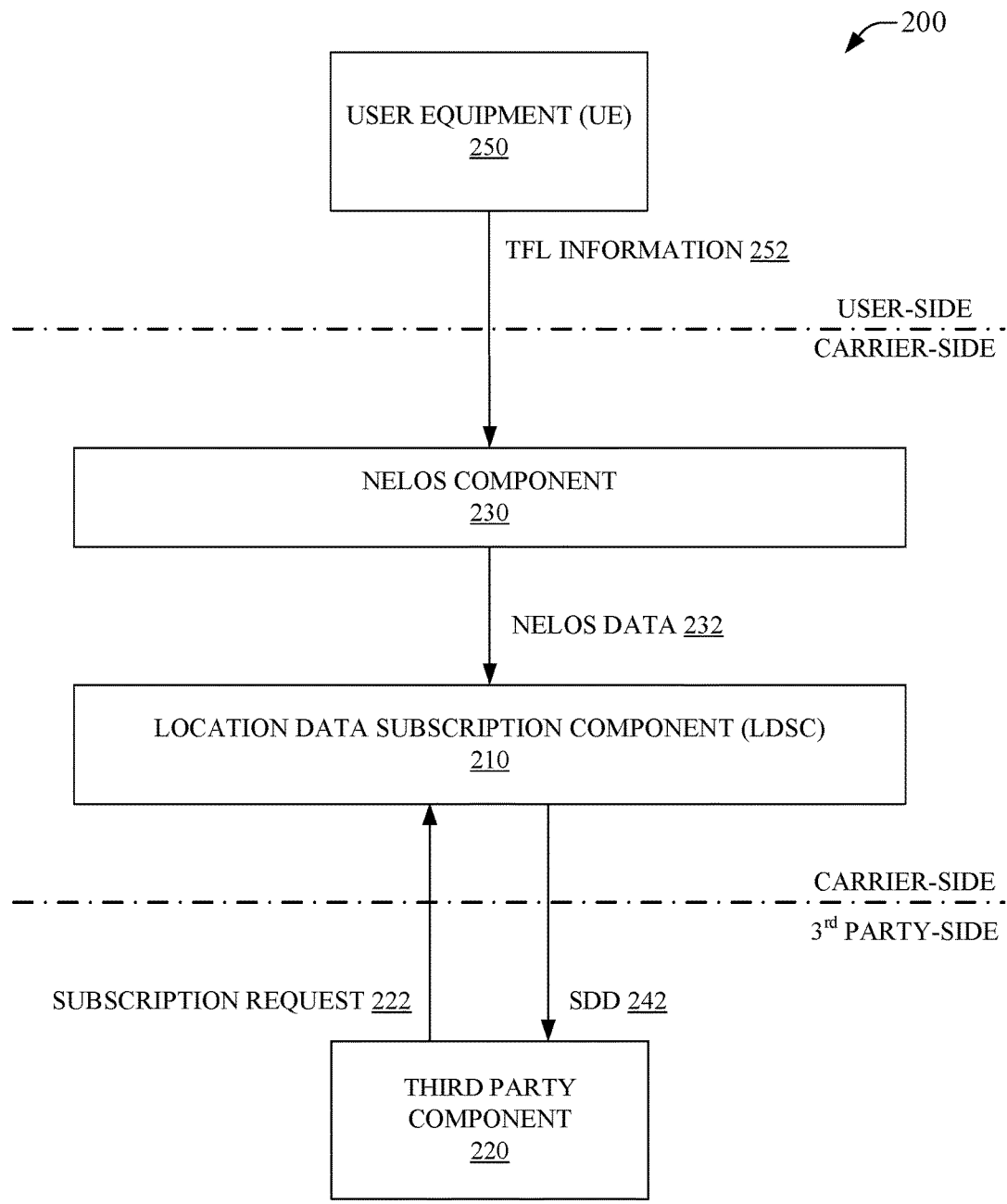
FIG. 2 is a depiction of an example system that facilitates access to mobile device location information by a third party in response to a subscription request in accordance with aspects of the subject disclosure.

In an embodiment, LDSC 110 can make control information, rules, etc., available to a NELOS component, such as NELOS component 230 in FIG. 2, etc., or to a UE, such as UE 250 of FIG. 2, etc. As an example, a rule can be communicated to a UE via LDSC 110 that can allow the UE to selectively store location information, TFL information, etc., and return the stored information to LDSC 110 in accord with the rule. This aspect can enable a variety of component configurations comprising, for example, UEs sourcing location information or timing information, NELOS components determining TFL information, LDSC 110 receiving NELOS data 132, and making SDD 142 available to other components or devices not illustrated in system 100. Some of these component configurations are illustrated in subsequent figures, though not all configurations are illustrated for clarity and brevity, although all such configurations are considered within the scope of the instant disclosure.

FIG. 2 is a depiction of a system 200 that can facilitate access to mobile device location information by a third party in response to a subscription request in accordance with aspects of the subject disclosure. System 200 can comprise LDSC 210. LDSC 210 can receive subscription request 222 from third party component 230. Third party component 230 can be a component or device associated with a third party, e.g., other than the carrier identity and a user identity associated with UE 250. As an example, third party component can be an emergency services or police component, an advertiser's server, a mapping service's device, etc. Subscription request 222 can comprise a parameter related to SDD 242. LDSC 210 can further receive NELOS data 232, from NELOS component 230, which can comprise location data related to UE 250. LDSC 210 can facilitate access to SDD 242 based on NELOS data 232 and subscription request 222. SDD 242 can comprise a location, location data, TFL information, NELOS information, derivatives thereof, or other related information.

NELOS component 230 can receive TFL information 252 from UE 250. As such, NELOS component 230 can generate NELOS data 232 based on TFL information 252. In an embodiment NELOS data 232 can be the same as TFL information 252, e.g., NELOS component 230 can pass TFL information 252 through as NELOS data 232. In other embodiments, NELOS data 232 can be different from TFL information 252, such as where TFL information 252 can comprise timing information that can be converted to location information by NELOS component 230 such that NELOS data 232 can comprise location information in place of, or in addition to, the timing information of TFL information 252.

In an aspect, UE 250 can be logically considered as located on a user-side of a communication link. As an example, UE 250 can be considered to be on the user-side of a radio link with a NodeB that itself can be considered to be on a carrier-side of the radio link. In a further similar aspect, NELOS component 230 and/or LDSC component 210 can be logically considered as located on a carrier-side of a communication link. As an example, NELOS component 230 and/or LDSC component 210 can be located at a carrier core network component. In another similar aspect, third party component 220 can be logically considered to be located on a third party-side of a communication link. As an example, where LDSC 210 is located in a carrier core component, it can be communicatively linked to third party component 220 via an internet connection wherein third party component 220 is located other than on the carrier-side of the internet link(s). In an aspect, system 200 can illustrate a possible end to end configuration highlighting sourcing of data from the user-side, processing of data at the carrier-side, and delivery of data in response to a request from the third party-side. System 200 is not intended to be limit the disclosure whereas numerous other configurations are readily appreciated and would be considered within the scope of the instant disclosure.

In an embodiment, LDSC 210 can receive a location or location data, e.g., TFL information 252, etc., via NELOS component 230, e.g., NELOS data 232, from UE 250. NELOS data 232 can comprise TFL or TFL information 252. As such, NELOS data 232 can comprise near real time location or location data, historical location or location data, cached location or location data, etc. These types of location related information, e.g., TFL information 252, etc., are distinct from more conventional types of location related information, such as that from GPS, triangulation, trilateration, beacon ranging, etc. As such, the use of TFL information 252, NELOS information 232, etc., in combination with the instant disclosure can provide, as disclosed herein, advantages over conventional technologies.

In an aspect, NELOS data 232 can be processed at LDSC 210 to generate SDD 242. SDD 242 can be received by third party component 250. SDD 242 can be responsive to parameters of subscription request 222. In an embodiment, subscription request 222 can represent a single SDD 242 request, e.g., one-time access to SDD 242. In other embodiments, subscription request 222 can represent a plural SDD 242 request, e.g., multiple access to updated SDD 242. In some embodiments, subscription request 222 can represent an ongoing SDD 242 request, e.g., ongoing access to updated SDD 242 within the scope of a subscription model. In an embodiment, SDD 242 can be 'pushed' to third party component 220 in an automated manner. This push-model can reduce multiple requests for access to SDD 242 from third party component 220. In another embodiment, third party component 220 can 'pull' SDD 242 from LDSC 210, e.g., requesting access to SDD 242, etc. In a further embodiment, LDSC 210 can publish SDD 242 and third party component 220 can access the published SDD 242. Other techniques facilitating access to SDD 242 are also to be considered within the scope of the present disclosure even where not recited for the sake of brevity.

Figure 3:
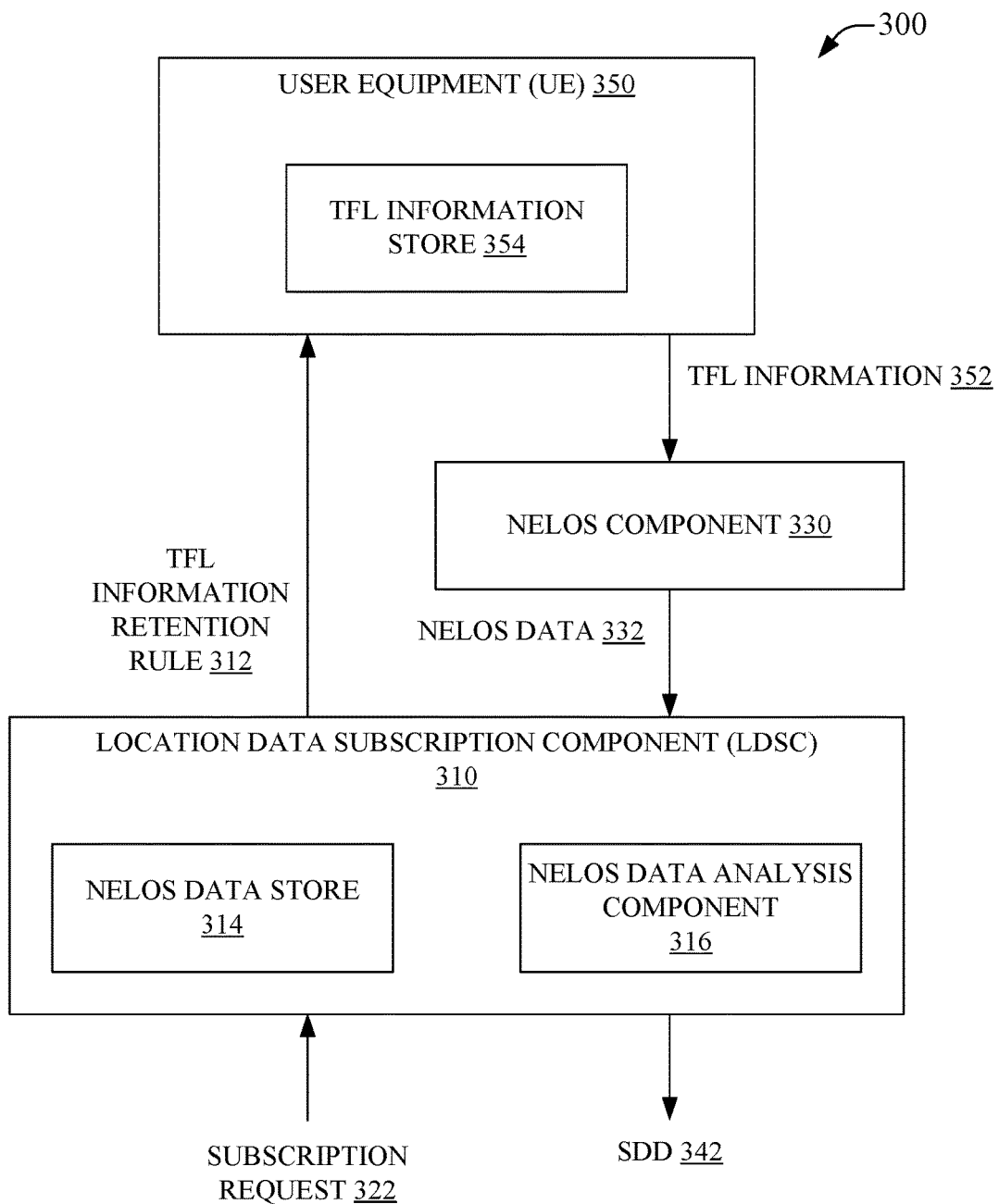
FIG. 3 illustrates an example system that facilitates access to mobile device location information and analysis in accordance with aspects of the subject disclosure.

FIG. 3 illustrates a system 300 that facilitates access to mobile device location information and analysis in accordance with aspects of the subject disclosure. System 300 can comprise LDSC 310. LDSC 310 can receive subscription request 322. Subscription request 322 can comprise a parameter related to SDD 342. LDSC 310 can further receive NELOS data 332, from NELOS component 330, which can comprise location data related to UE 350. LDSC 310 can facilitate access to SDD 342 based on NELOS data 332 and subscription request 322. SDD 342 can comprise a location, location data, TFL information, NELOS information, derivatives thereof, or other related information.

NELOS component 330 can receive TFL information 352 from UE 350. As such, NELOS component 330 can generate NELOS data 332 based on TFL information 352. In an embodiment NELOS data 332 can be the same as TFL information 352, e.g., NELOS component 330 can pass TFL information 352 through as NELOS data 332. In other embodiments, NELOS data 332 can be different from TFL information 352, such as where TFL information 352 can comprise timing information that can be converted to location information by NELOS component 330 such that NELOS data 332 can comprise location information in place of, or in addition to, the timing information of TFL information 352. As such, NELOS data 332 can comprise near real time location or location data, historical location or location data, cached location or location data, etc. These types of location related information, e.g., TFL information 352, etc., are distinct from more conventional types of location related information, such as that from GPS, triangulation, trilateration, beacon ranging, etc. As such, the use of TFL information 352, NELOS information 332, etc., in combination with the instant disclosure can provide, as disclosed herein, advantages over conventional technologies.

In an aspect, NELOS data 332, once received by LDSC 310, can be stored at NELOS data store 314. NELOS data store 314 can further be employed to store and update SDD 342, such as storing and updating SDD 342 between accessed from a third party component, e.g., 220, etc. In an embodiment, LDSC 310 can receive more NELOS data 332 than can be associated with subscription request 322, whereby LDSC 310 can store the pertinent portion of NELOS data 332 at NELOS data store 314. In another embodiment, NELOS data store 314 can retain excess NELOS data 332 to allow for potential updates to subscription request 322. As an example, where other subscription requests indicate a trend to include proximity to a sporting event for a particular geographic region, LDSC 310 can begin storing proximity information at NELOS data store 314 for other subscribers even though they may not yet have requested that information. This can allow LDSC 310 to be more responsive in providing proximity information where the subscriptions are updated to request this additional information. LDSC 310 can analyze NELOS data 332 and/or data stored on NELOS data store 314 via NELOS data analysis component 316 to facilitate determining SDD 342. Nearly any analysis can be performed at NELOS data analysis component 316. As an example, data can be aggregated, personally identifying information can be removed, average values can be generated, trends can be determined, locations, modes of travel, etc.

In some embodiments, UE 350 can further comprise TFL information store 354. TFL information store 354 can store TFL information related to UE 350. In an aspect, this can be related to determining TFL information 352. Further, TFL information store 354 can store TFL information based on received TFL information retention rule 312. TFL information retention rule 312 can be related to types of information to be retained at TFL information store 354, amounts of information to be retained at TFL information store 354, filtering of information retained at TFL information store 354, etc. In an embodiment, TFL information 352 can comprise information from TFL information store 354.

Figure 4:
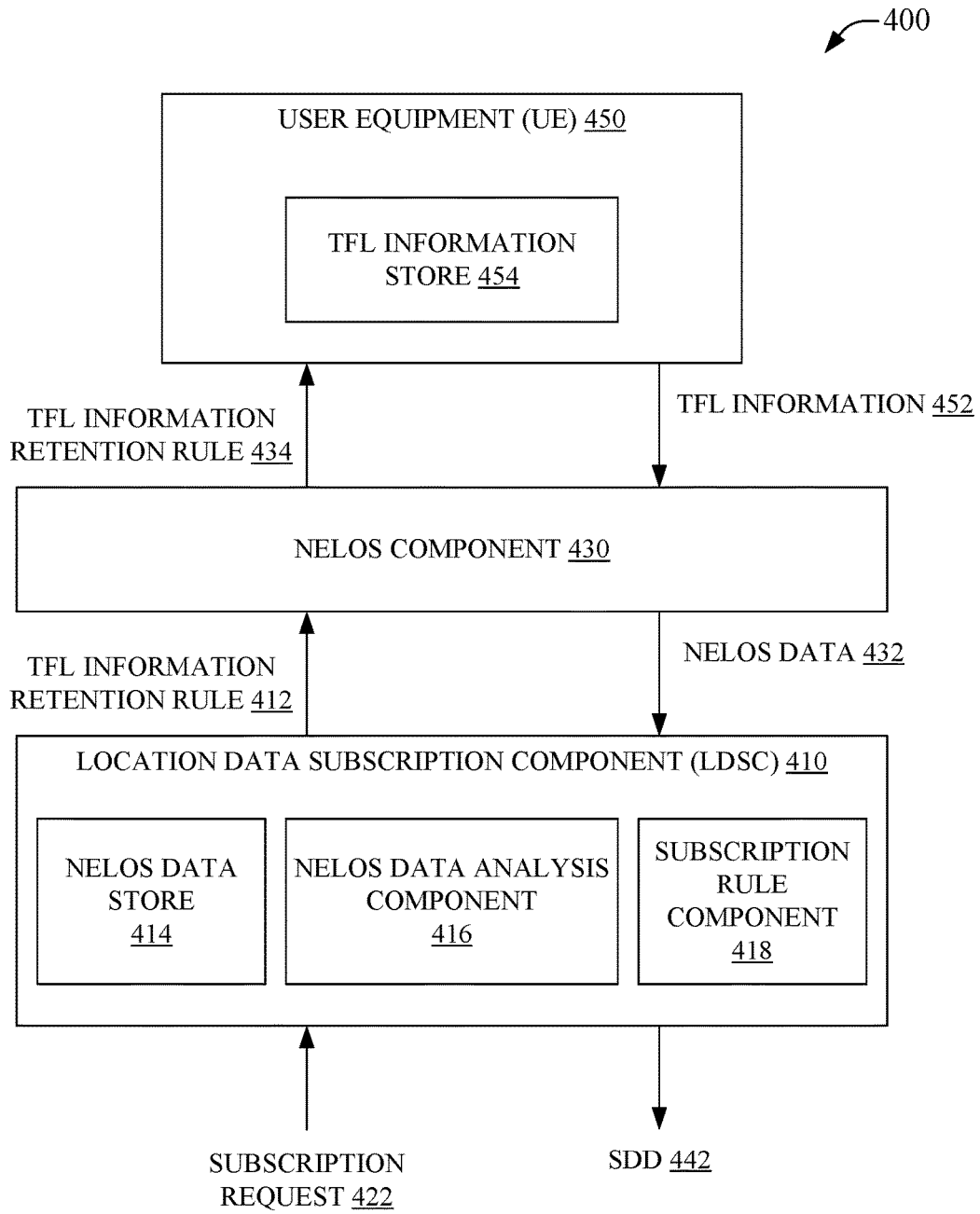
FIG. 4 illustrates an example system that facilitates access to mobile device location information subject to subscription rules in accordance with aspects of the subject disclosure.

FIG. 4 illustrates a system 400 that facilitates access to mobile device location information subject to subscription rules in accordance with aspects of the subject disclosure. System 400 can comprise LDSC 410. LDSC 410 can receive subscription request 422. Subscription request 422 can comprise a parameter related to SDD 442. LDSC 410 can further receive NELOS data 432, from NELOS component 430, which can comprise location data related to UE 450. LDSC 410 can facilitate access to SDD 442 based on NELOS data 432 and subscription request 422. SDD 442 can comprise a location, location data, TFL information, NELOS information, derivatives thereof, or other related information.

NELOS component 430 can receive TFL information 452 from UE 450. As such, NELOS component 430 can generate NELOS data 432 based on TFL information 452. In an embodiment NELOS data 432 can be the same as TFL information 452. In other embodiments, NELOS data 432 can be different from TFL information 452. As such, NELOS data 432 can comprise near real time location or location data, historical location or location data, cached location or location data, etc. These types of location related information, e.g., TFL information 452, etc., can be distinct from more conventional types of location related information, such as that from GPS, triangulation, trilateration, beacon ranging, etc. As such, the use of TFL information 452, NELOS information 432, etc., in combination with the instant disclosure can provide, as disclosed herein, advantages over conventional technologies.

In an aspect, NELOS data 432, once received by LDSC 410, can be stored at NELOS data store 414. NELOS data store 414 can further be employed to store and update SDD 442. In an embodiment, LDSC 410 can receive more NELOS data 432 than can be associated with subscription request 422, whereby LDSC 410 can store a portion of NELOS data 432 at NELOS data store 414. In another embodiment, NELOS data store 414 can retain excess NELOS data 432 to allow for potential updates to subscription request 422.

LDSC 410 can analyze NELOS data 432 and/or data stored on NELOS data store 414 via NELOS data analysis component 416 to facilitate determining SDD 442. Nearly any analysis can be performed at NELOS data analysis component 416. As an example, data can be aggregated, personally identifying information can be removed, average values can be generated, trends can be determined, locations, modes of travel, etc.

LDSC 410 can further comprise subscription rule component 418. In an embodiment, subscription rule component 418 can store a rule related to subscription request 422. In another embodiment, subscription rule component 418 can update a rule based on subscription request 422. In a further embodiment, subscription rule component 418 can apply a rule related to a subscription request, e.g., subscription request 422. Application of a rule by subscription rule component 418 can affect information stored at NELOS data store 414, can affect analysis performed by NELOS data analysis component 416, can adjust TFL information retention, e.g., via updating TFL information retention rule 412, etc. In an embodiment, subscription rule component 418 can apply a tiered or ordered rule. As an example, subscription request 422 can include a rule update for subscription rule component 418 such that where the subscriber has a plurality of stored subscription requests for both smartphones and tablet computers, subscription request 422 can result in an update to only the tablet computer requests and the smartphone requests can remain unaltered.

In some embodiments, UE 450 can further comprise TFL information store 454. TFL information store 454 can store TFL information related to UE 450. In an aspect, this can be related to determining TFL information 452. In an embodiment, TFL information 452 can comprise information from TFL information store 454. Further, TFL information store 454 can store TFL information based on received TFL information retention rule 434. TFL information retention rule 434 can be based on TFL information retention rule 412. In an embodiment, NELOS component 432 can pass TFL information retention rule 412 through as TFL information retention rule 432, e.g., TFL information retention rule 412 can remain unchanged. In another embodiment, TFL information retention rule 412 can be received by NELOS component 430, which in turn can generate TFL information retention rule 432 based on TFL information retention rule 412. As such, TFL information retention rule 432 can be the same as, partially the same as, or related to yet different from TFL information retention rule 412.

Figure 5:
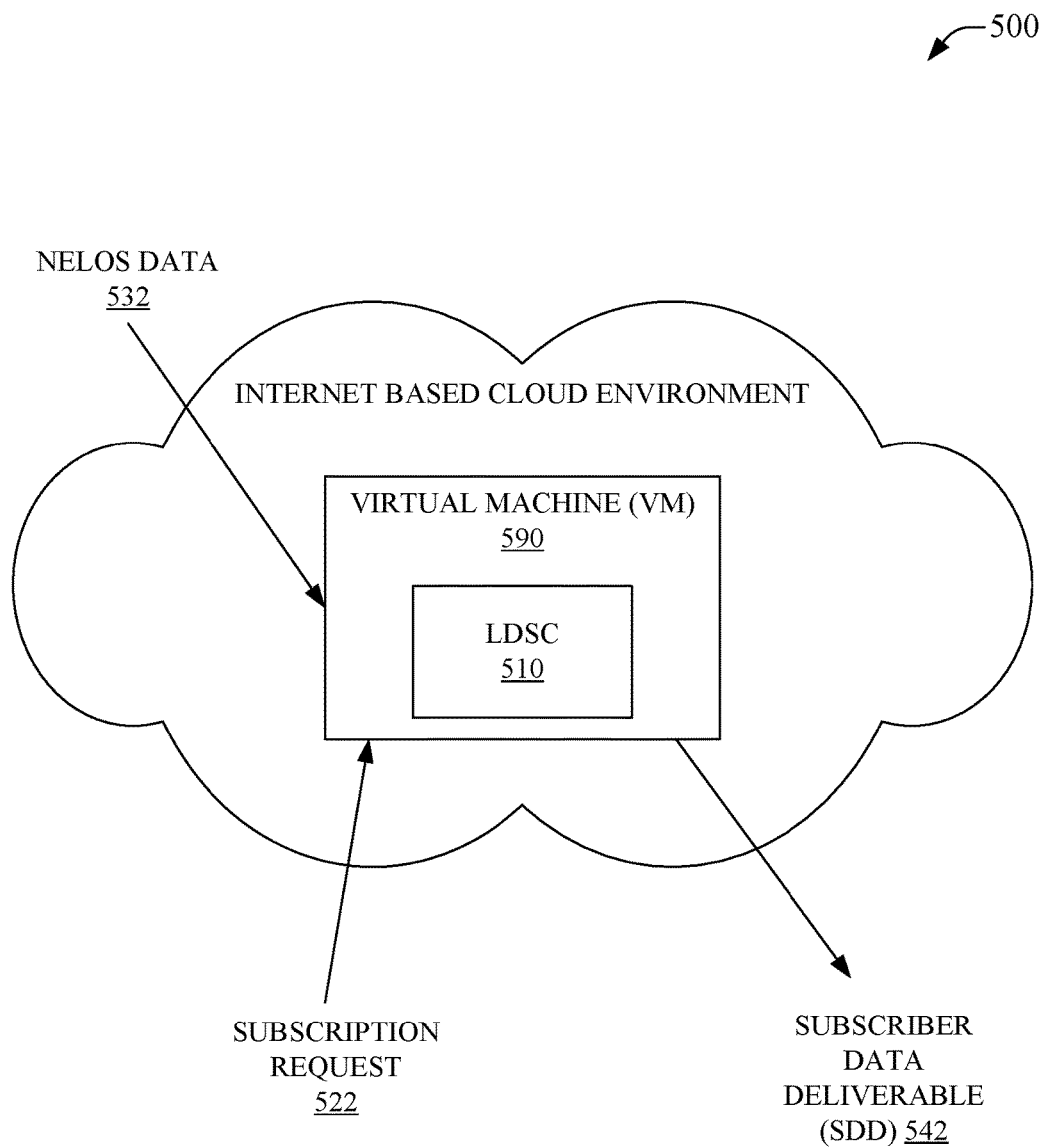
FIG. 5 illustrates an example system that facilitates access to mobile device location information via a cloud-based deployment in accordance with aspects of the subject disclosure.

FIG. 5 illustrates a system 500 that facilitates access to mobile device location information via a cloud-based deployment in accordance with aspects of the subject disclosure. Scheme 500 illustrates location data subscription component (LDSC) 510 that can receive subscription request 522 via virtual machine (VM) 590. VM 590 can be executing in an internet based cloud environment (hereinafter, 'the cloud'). The cloud can enable deployment of VM 590 comprising LDSC 510 on devices that may not be physically considered as carrier-side devices. However, in some embodiments where a carrier is closely related to the operation of VM 590, LDSC 510 can logically be considered as a carrier-side component. In other embodiments, VM 590 can be associated with another party that can have an agreement to receive NELOS data 532, e.g., a mobile network operator (MNO) or mobile virtual network operator (MVNO) can operate a location service via VM 590 and license NELOS data 532 to allow them to provide location services to a third party, e.g., via SDD 542.

LDSC 510 can further receive subscription request 522 via VM 590 in the cloud. Subscription request 522 can comprise a parameter related to subscriber data deliverable (SDD) 542, such as frequency of reporting, a reporting trigger such as an event, proximity, time, identifier(s), etc., a type of returned data such as location, timing information, derivatives of location or timing information, etc., price, device, age, etc.

LDSC 510 can further receive NELOS data 532 via VM 590. NELOS data 532 can comprise location data related to a mobile device or other UE. LDSC 510 can facilitate access to SDD 542, via VM 590, based on NELOS data 532 and subscription request 522. SDD 542 can comprise a location, location data, TFL information, NELOS information, derivatives thereof, or other related information.

In an embodiment, NELOS data 532 can be sourced from a NELOS component, e.g., NELOS component 230 in FIG. 2, etc., from a UE directly, or via another component such as a data store, another cloud-based virtual device, etc. NELOS data 532 can comprise TFL or TFL information. As such, NELOS data 532 can comprise near real time location or location data, historical location or location data, cached location or location data, etc. NELOS data 532 can be distinct from more conventional types of location related information, such as that from GPS, triangulation, trilateration, beacon ranging, etc. As such, the use of TFL, TFL information, NELOS information, NELOS technology, etc., in combination with the instant disclosure provides advantages over conventional technologies.

In an aspect, NELOS data 532 can be analyzed at LDSC 510 in generating SDD 542. In an embodiment, NELOS data 532 can be passed as SDD 542 without change, e.g., the analysis does not change NELOS data 532. In other embodiments, NELOS data 532 can be processed, analyzed, etc., such that SDD 542 comprises information derived from NELOS data 532, e.g., SDD 542 is not the same as NELOS data 532. As an example, where LDSC 510 analyzes NELOS data 532 and determines that a portion of it is associated with a minor child, this portion can be blocked and the balance of the information can be made available as SDD 542.

In an embodiment, LDSC 510 can make control information, rules, etc., available to a NELOS component, such as NELOS component 230 in FIG. 2, etc., or to a UE, such as UE 250 of FIG. 2, etc., via an internet link between VM 590 and the NELOS component or UE. As an example, a rule can be communicated to a UE from LDSC 510 via VM 590 that can allow the UE to selectively store location information, TFL information, etc., and return the stored information to LDSC 510, via NELOS data 532, in accord with the rule. This aspect can enable a variety of component configurations comprising, for example, UEs sourcing location information or timing information, NELOS components determining TFL information, LDSC 510 receiving NELOS data 532, and making SDD 542 available to other components or devices not illustrated in system 500.

Figure 6:
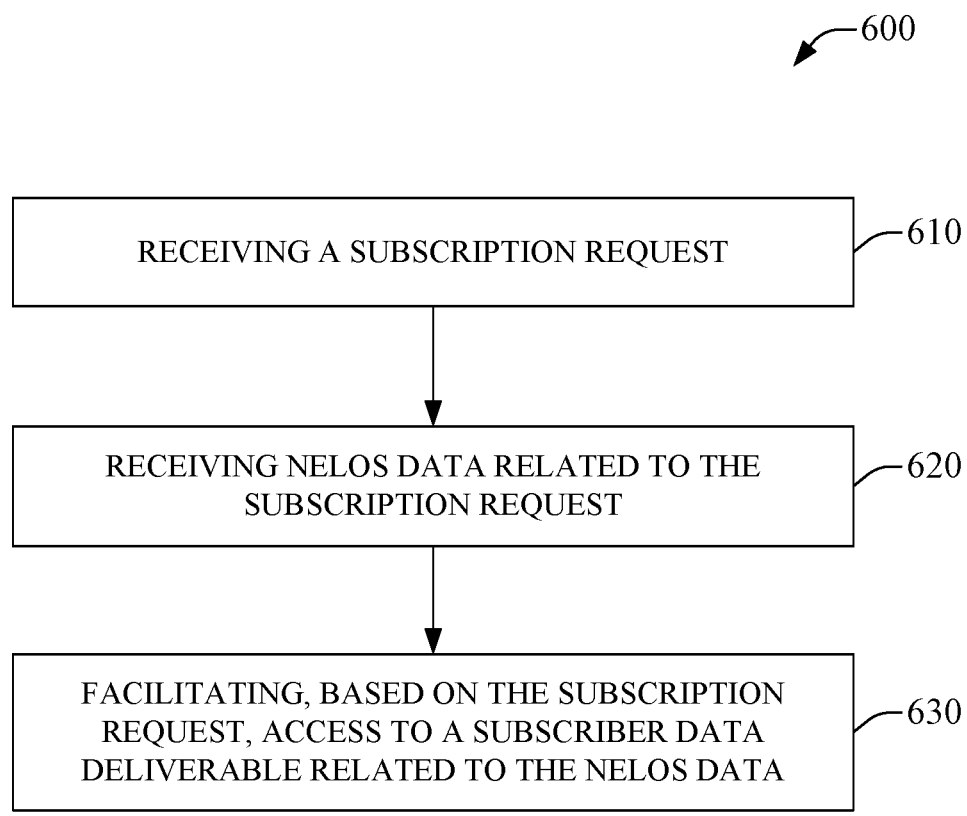
FIG. 6 illustrates an example method facilitating access to mobile device location information in accordance with aspects of the subject disclosure.
Figure 7:
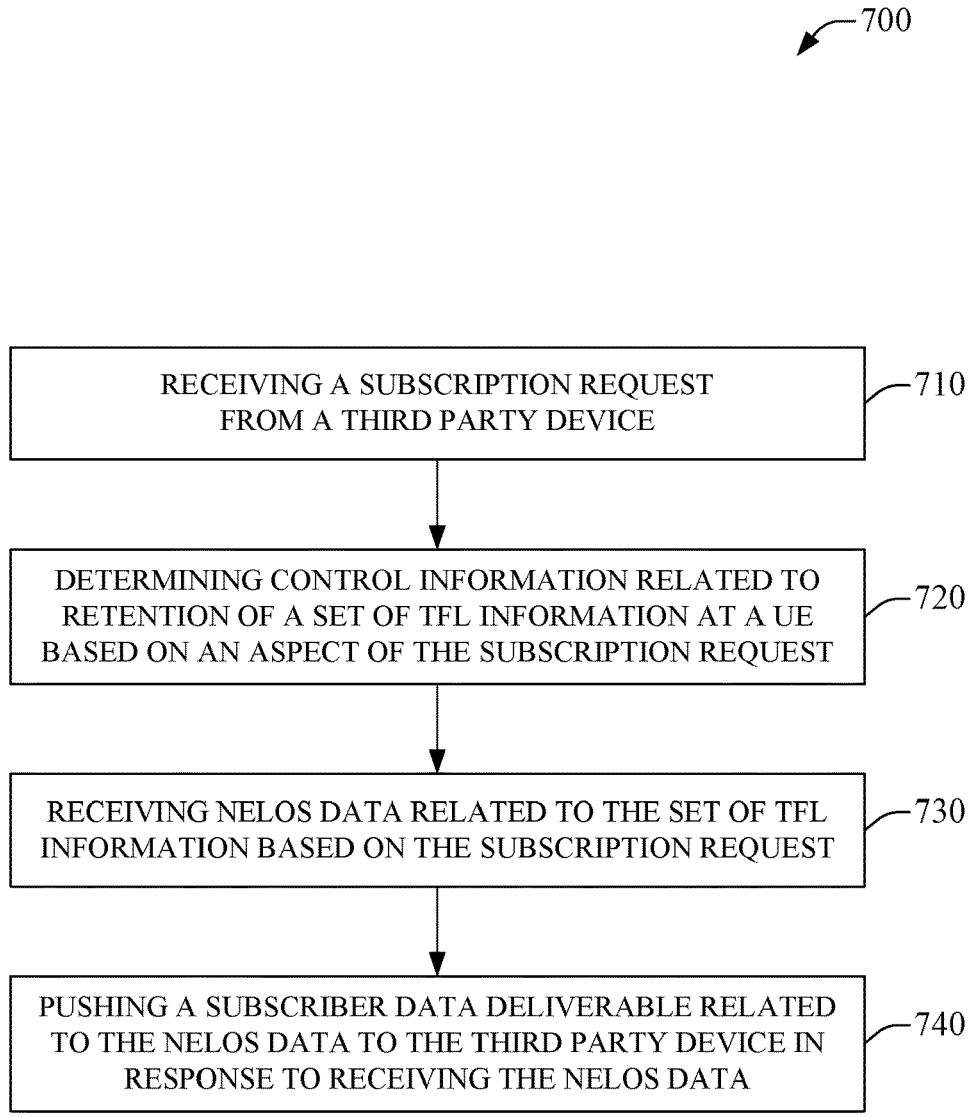
FIG. 7 depicts an example method facilitating a push of mobile device location information and employing control information in accordance with aspects of the subject disclosure.
Figure 8:
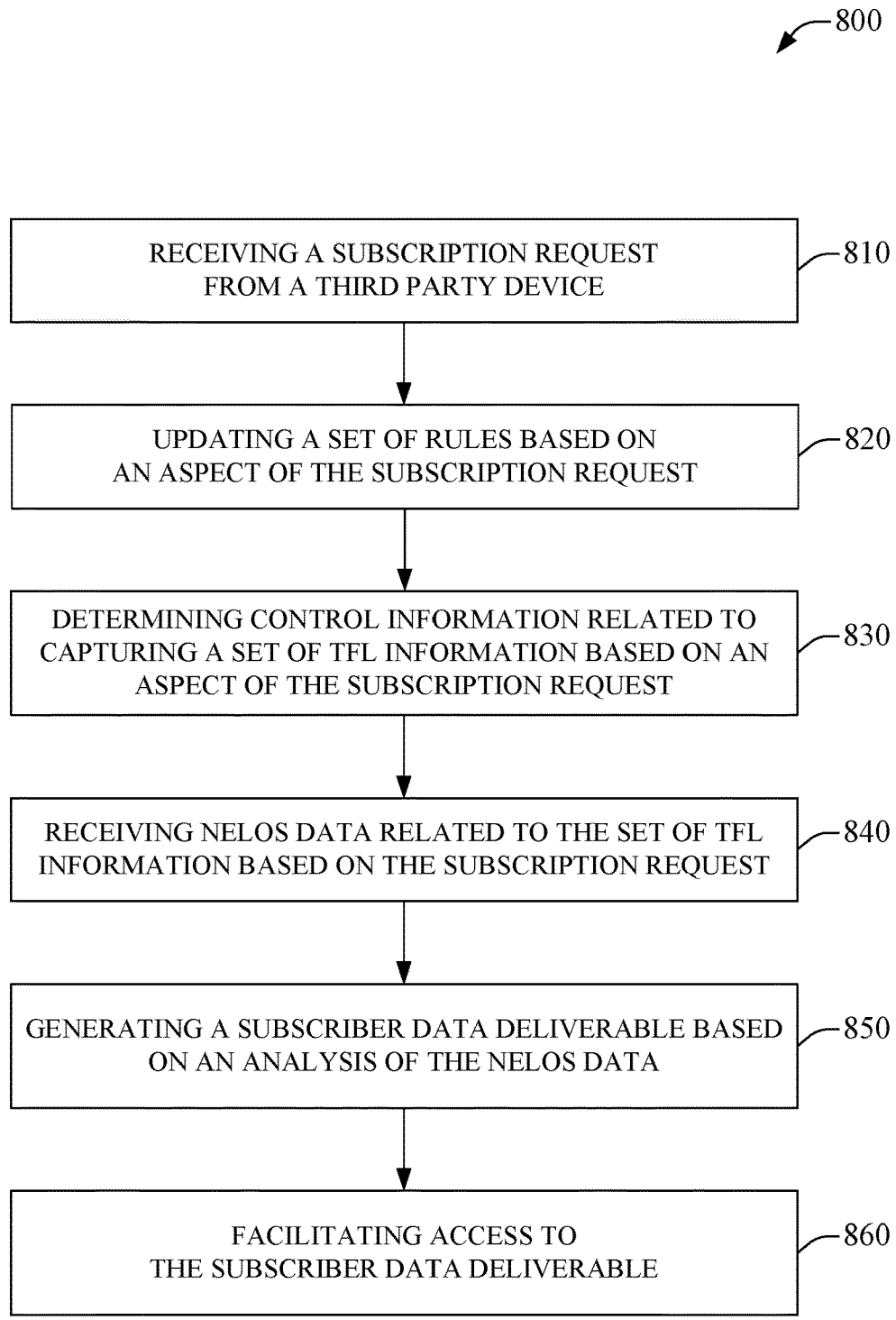
FIG. 8 illustrates an example method facilitating access to mobile device location information and analysis in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating access to mobile device location information in accordance with aspects of the subject disclosure. At 610, method 600 can include receiving a subscription request. A subscription request can comprise a parameter related to location information to be made available, e.g., SDD 142, etc. The parameter can include aspects such as frequency of reporting, a reporting trigger, such as an event, proximity to a locus, a time, an elapsed time, an identifier(s), etc., a type of data to return, such as location type, timing type information, derivative type, etc., a price, a device or model, an age, etc. In an aspect, a subscription request can be received from a third party and can facilitate returning location information back to the third party. In some embodiments, the subscription request can be a one-time data request, a multi-part data request, an on-going data request, etc.

At 620, method 600 can comprise receiving NELOS data, e.g., NELOS data 132, etc., related to the subscription request at 610. NELOS data can comprise location data related to a mobile device or other UE. NELOS data can be received, for example, from a NELOS component such as NELOS component 230 in FIG. 2, etc., from a UE directly, or via another component such as a data store, cloud environment device, etc. NELOS data can comprise TFL or TFL information. As such, NELOS data can comprise near real time location or location data, historical location or location data, cached location or location data, etc. The particulars of capturing, determining, or generating TFL, TFL information, or NELOS information is outside of the scope of the instant disclosure except where more particularly pointed out herein and to note that these types of location related information, e.g., TFL information, etc., are distinct from more conventional types of location related information, such as that from GPS, triangulation, trilateration, beacon ranging, etc. As such, the use of TFL, TFL information, NELOS information, NELOS technology, etc., in combination with the instant disclosure provides advantages over conventional technologies.

At 630, method 600 can include facilitating access to location information to be made available, e.g., SDD 142, etc., based on the NELOS data at 620 and the subscription request at 610. At this point, method 600 can end. The location information can comprise a location, location data, TFL information, NELOS information, derivatives thereof, or other related information. In an embodiment, NELOS data can be made available, in response to receiving the subscription request at 610, without change. In other embodiments, NELOS data can be processed, analyzed, etc., such that the information made available, in response to the subscription request at 610, comprises information derived from NELOS data, e.g., the information made available can be different from the NELOS data.

FIG. 7 illustrates a method 700 that facilitates pushing mobile device location information to a subscriber and employing control information in accordance with aspects of the subject disclosure. At 710, method 700 can include can include receiving a subscription request from a third party device. A subscription request can comprise a parameter related to location information to be made available. A third party device can be a device associated with an entity identifier other than one associated with a carrier identity or a mobile device user identity. In some embodiments, the subscription request can be a one-time data request, a multi-part data request, an on-going data request, etc. In some embodiments, the subscription request can further comprise a rule. The rule can be related to filtering NELOS data or selecting a subset of NELOS data that comports with the intent of the subscription request. As an example, the rule can relate not only to how often the location data can be accessed, but also as to the type of NELOS data, range of NELOS data, etc., that can be made available to a third party device under method 700.

At 720, method 700 can comprise determining control information. In an embodiment, control information can communicated to a UE that can allow the UE to selectively store location information, TFL information, etc., and return the stored information, e.g., as NELOS data or a precursor thereto, in accord with the rule. The control information can be related to retention of a set of TFL information at the UE and can be based on an aspect of the subscription request at 710. This aspect can enable a variety of component configurations comprising, for example, UEs sourcing location information or timing information, NELOS components determining TFL information, etc. Some of these component configurations are illustrated in the instant figures, though not all configurations are illustrated for clarity and brevity.

At 730, method 700 can comprise receiving NELOS data related to the subscription request at 710. NELOS data can comprise location data related to a mobile device or other UE. NELOS data can be received, for example, from a NELOS component, from a UE directly, or via another component such as a data store, cloud environment device, etc. NELOS data can comprise TFL or TFL information. As such, NELOS data can comprise near real time location or location data, historical location or location data, cached location or location data, etc.

At 740, method 700 can include facilitating access to a subscriber data deliverable (SDD), e.g., SDD 142, etc., based on the NELOS data at 730, subject to the control information at 720, and the subscription request at 710. At this point, method 700 can end. The SDD can then be made available to the third party device via a 'push' of the data. The location information can comprise a location, location data, TFL information, NELOS information, derivatives thereof, or other related information. In an embodiment, NELOS data can be made available, in response to receiving the subscription request at 710, without change. In other embodiments, NELOS data can be processed, analyzed, etc., such that the SDD, in response to the subscription request at 710, comprises information derived from NELOS data, e.g., the information made available can be different from the NELOS data.

FIG. 8 illustrates a method 800 that facilitates access to mobile device location information and analysis in accordance with aspects of the subject disclosure. At 810, method 800 can include can include receiving a subscription request from a third party device. A subscription request can comprise a parameter related to location information to be made available. In an embodiment, a third party device can be a device associated with an entity identifier other than one associated with a carrier identity or a mobile device user identity. In another embodiment, a third party device can be another device on the carrier-side or user-side. As an example, a third party device can be another device of the carrier that can be treated as an 'independent entity' divorced from the NELOS/TFL components, such as, providing location information to an application executing on another carrier server, an application executing on another UE, an MVNO virtual device executing in a VM on a carrier device, etc.

At 820, method 800 can update a set of rules based on an aspect of the subscription request. In some embodiments, the subscription request can include a parameter reflecting an number of SDD accesses permitted, e.g., a one-time SDD access, multiple updated SDD access, on-going updated SDD access, etc. In other embodiments, the subscription request can also comprise a rule related to filtering NELOS data or selecting a subset of NELOS data that comports with the intent of the subscription request.

At 830, method 800 can comprise determining control information. In an embodiment, control information can communicated to a UE that can allow the UE to selectively store location information, TFL information, etc., and return the stored information, e.g., as NELOS data or a precursor thereto, in accord with the control information. The control information can be related to retention of a set of TFL information at the UE and can be based on an aspect of the subscription request at 810. This aspect can enable a variety of component configurations comprising, for example, UEs sourcing location information or timing information, NELOS components determining TFL information, etc. Some of these component configurations are illustrated in the instant figures, though not all configurations are illustrated for clarity and brevity.

At 840, method 800 can comprise receiving NELOS data related to the subscription request at 810. NELOS data can comprise location data related to a mobile device or other UE. NELOS data can be received, for example, from a NELOS component, from a UE directly, or via another component such as a data store, cloud environment device, etc. NELOS data can comprise TFL or TFL information. As such, NELOS data can comprise near real time location or location data, historical location or location data, cached location or location data, etc.

At 850, method 800 can comprise generating an SDD based on an analysis of the NELOS data at 840 and the subscription request at 810, subject to the control information at 830 and the rules at 820. The SDD can comprise a location, location data, TFL information, NELOS information, derivatives thereof, or other related information.

At 860, method 800 can include facilitating access to the SDD. At this point, method 800 can end. In an embodiment, the SDD can then be made available to the third party device via a 'push' of the data. In another embodiment, the SDD can then be made available to the third party device via a 'pull' of the data by the third party device. In a further embodiment, the SDD can then be made available to the third party device via a publishing of the data such that the third party device can poll the data independently. In an embodiment, NELOS data can be processed, analyzed, etc., such that the SDD, in response to the subscription request at 810, comprises information derived from NELOS data, e.g., the information made available can be different from the NELOS data. Of note, the analysis may result in no change of the NELOS data provided as the SDD, e.g., the g., the information made available can be the same as the NELOS data.

Figure 9:
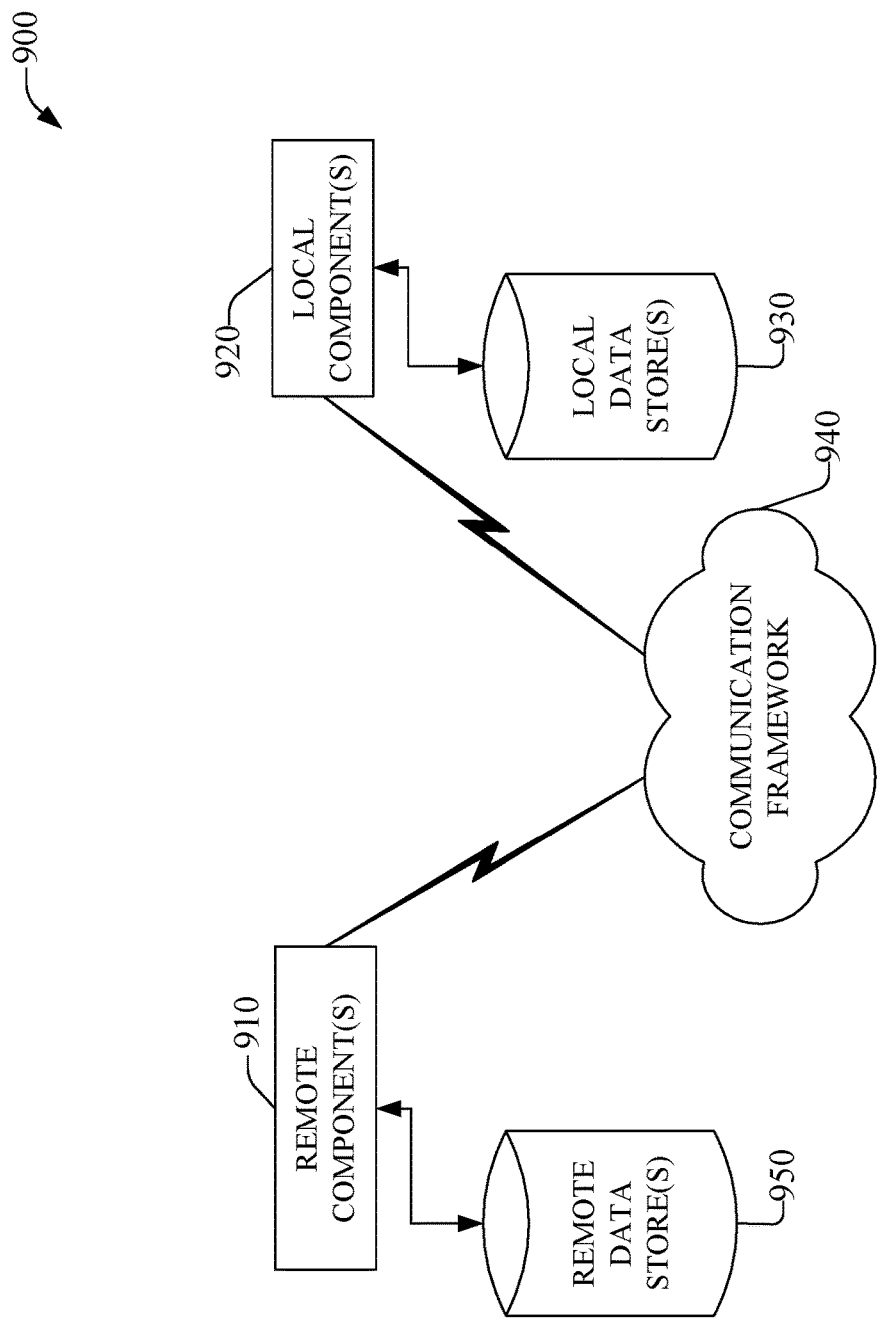
FIG. 9 depicts an example schematic block diagram of a computing environment with which the disclosed subject matter can interact, or in which aspects can be implemented.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be a UE 250, 350, 450, etc., third party component 220, etc., NELOS component 230, 330, 430, etc.

The system 900 also includes one or more local component(s) 920. The local component(s) 920 can be hardware and/or software (e.g., threads, processes, computing devices). In some embodiments, local component(s) 920 can include, for example, LDSC 110, 210, 310, 410, 510, etc., NELOS component 230, 330, 430, etc., VM 590, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
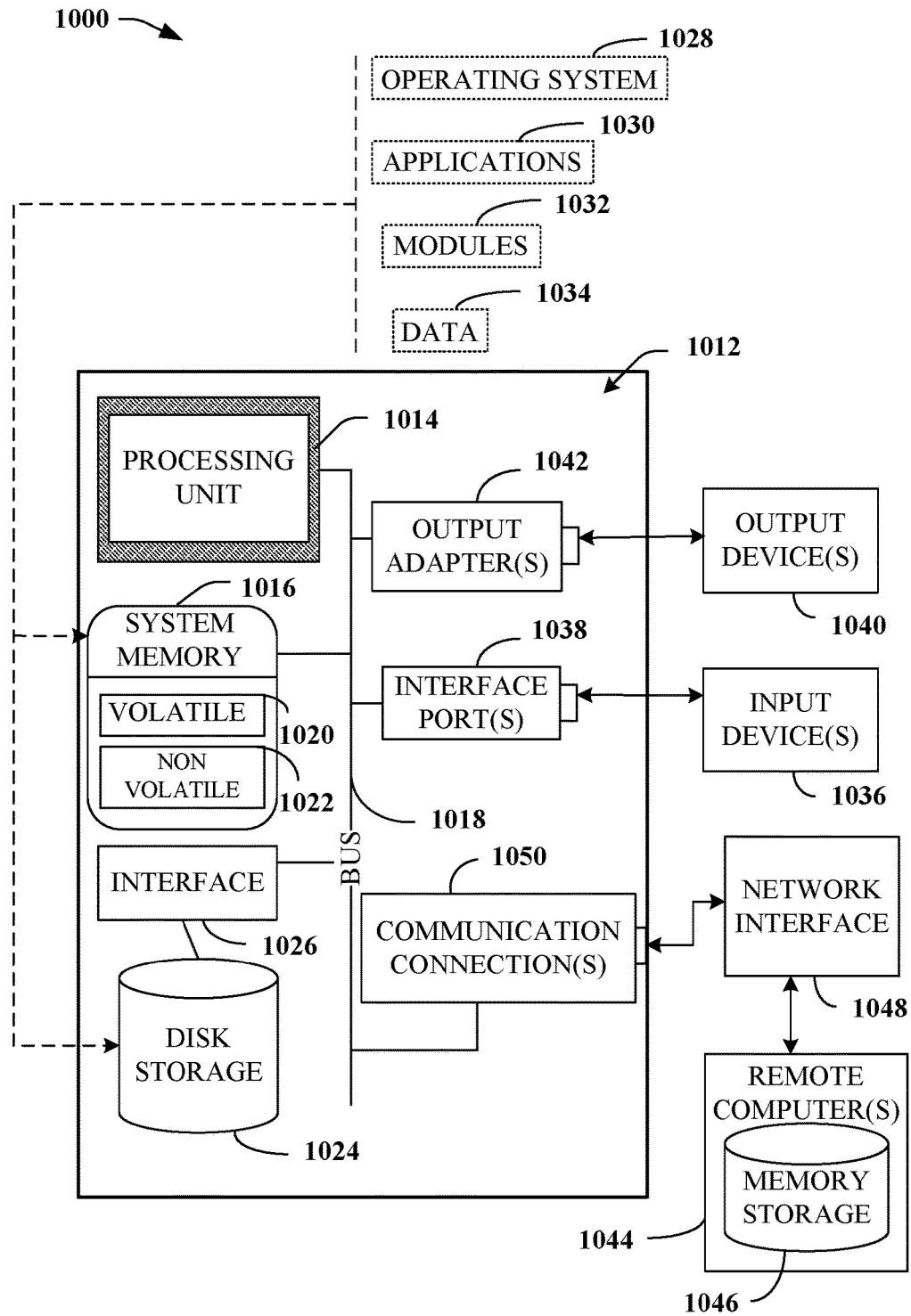
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of LDSC 110, 210, 310, 410, 510, etc., NELOS component 230, 330, 430, etc., VM 590, etc., UE 250, 350, 450, etc., third party component 220, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving a subscription request from a third party component, wherein the request is related to facilitating access to location data by the system, e.g., LDSC 110, 210, 310, 410, 510, etc., and in response to the receiving the subscription request, receiving NELOS data by the system, and pushing the location data to the third party component, without an additional request by the third party component.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of aspects of a subscription request via third party component 220, etc., and can be embodied in a touch sensitive display panel, a mouse input GUI, a command line controlled interface, etc., allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, can refer to a wireless device utilized by a wireless services subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   storing network event locating system information received from mobile devices, wherein the network event locating system information comprises first network event locating system information corresponding to a first mobile device of the mobile devices, wherein the network event locating system information comprises timing information, and wherein the network event locating system information is stored remotely from the first mobile device;
   receiving a first request for first mobile device location information of the first mobile device from a requesting device, wherein the requesting device is located remotely from the processor, and wherein the requesting device is located remotely from the first mobile device; and
   in response to determining that a subscription rule corresponding to a subscribing entity that pays for access to the first mobile device location information and is associated with the requesting device has been satisfied based on a price, a first identity associated with the first mobile device, and a second identity associated with the requesting device, initiating, by the processor on behalf of the first mobile device, access to the first network event locating system information associated with the first mobile device, wherein the first network event locating system information comprises the timing information to facilitate determining a first estimation of a first geographic location of the first mobile device based on a first differential time measurement between the first mobile device and a first NodeB device and second NodeB device, a first historic geographic location value for a first NodeB site pair of devices comprising the first NodeB device, and a second historic geographic location value for a second NodeB site pair of devices comprising the second NodeB device.

2. The system of claim 1, wherein the initiating the access to the first network event locating system information comprises enabling the access to updated first network event locating system information by the requesting device without a further request from the requesting device.

3. The system of claim 1, wherein the initiating the access to the first network event locating system information comprises publishing the first network event locating system information to enable a polling of the first network event locating system information by the requesting device without receiving a further request from the requesting device.

4. The system of claim 1, wherein the operations further comprise:
receiving a second request for second mobile device location information of a second mobile device of the mobile devices from the requesting device, and wherein the requesting device is located remotely from the second mobile device; and
initiating, by the processor on behalf of the second mobile device, access to second network event locating system information associated with the second mobile device, wherein the second network event locating system information comprises a second estimation of a second geographic location of the second mobile device based on a second differential time measurement between the second mobile device and a third NodeB device and fourth NodeB device, a third historic geographic location value for a third NodeB site pair of devices comprising the third NodeB device, and a fourth historic geographic location value for a fourth NodeB site pair of devices comprising the fourth NodeB device.

5. The system of claim 4, wherein the first mobile device and the second mobile device employ a same wireless network provider system.

6. The system of claim 4, wherein the first mobile device employs a first wireless network provider system and the second mobile device employs a second wireless network provider system that is different than the first wireless network provider system.

7. The system of claim 1, wherein the network event locating system information comprises idle-state timed fingerprint location information for the first mobile device in an idle state.

8. The system of claim 1, wherein the executable instructions are executed on a network server device.

9. A method, comprising:
receiving, by a device comprising a processor, location determination information for user equipments, wherein the location determination information comprises network event locating system information corresponding to a user equipment of the user equipments, wherein the network event locating system information comprises timing information, and wherein the location determination information is stored remotely from the user equipments;
receiving, by the device, a paid subscription request from a subscribing device, wherein the subscription request relates to a location of the user equipment, and wherein the device and the subscribing device are each located remotely from the user equipment; and
in response to determining, by the device, that a subscription rule corresponding to a subscribing entity that is associated with the subscribing device and is related to permitting access has been satisfied based on a first identity affiliated with the user equipment and a second identity affiliated with the subscribing device, enabling access to the network event locating system information, wherein the timing information of the network event locating system information facilitates determining an estimation of a geographic location of the user equipment based on a differential time measurement related to a disposition of the user equipment relative to a first NodeB device and a second NodeB device, a first historic geographic location value for a first NodeB site pair of devices comprising the first NodeB device, and a second historic geographic location value for a second NodeB site pair of devices comprising the second NodeB device.

10. The method of claim 9, wherein the enabling the access comprises enabling the access to a data deliverable comprising the network event locating system information.

11. The method of claim 9, wherein the enabling the access comprises enabling the access to a polling server device facilitating access to the network event locating system information.

12. The method of claim 9, wherein the enabling the access to the network event locating system information comprises enabling the access to updated network event locating system information without a subsequent request from the subscribing device.

13. The method of claim 9, wherein the user equipment is first user equipment, and wherein the enabling the access to the network event locating system information comprises enabling the access to first network event locating system information for the first user equipment associated with a first wireless carrier and enabling access to second network event locating system information for a second user equipment associated with a second wireless carrier.

14. The method of claim 13, wherein the first wireless carrier and the second wireless carrier are different wireless carriers.

15. The method of claim 9, wherein the network event locating system information comprises idle-state timed fingerprint location information associated with the user equipment for the user equipment in an idle state.

16. A non-transitory machine-readable storage medium, comprising executable instructions that, when executed by a processor, facilitate performance of operations, comprising:
receiving mobile device location information for mobile devices, wherein the mobile devices are remotely located from the processor;
determining that a request for mobile device location information from a subscriber device satisfies a subscriber access rule based on a first identity corresponding to the mobile device and a second identity corresponding to the subscriber device, wherein the mobile device location information corresponds to a mobile device of the mobile devices, wherein the subscriber device is associated with a subscribing entity that pays for access to the mobile device location information, and wherein the subscriber device is remotely located form the processor; and initiating, based on the subscriber access rule being satisfied, access for the subscriber device to network event locating system information comprising timing information corresponding to the mobile device, wherein the network event locating system information facilitates determining an estimation of a geographic location of the mobile device based on a differential time measurement related to a proximity of the mobile device to a first NodeB device and a second NodeB device, a first historic geographic location value for a first NodeB site pair of devices comprising the first NodeB device, and a second historic geographic location value for a second NodeB site pair of devices comprising the second NodeB device.

17. The non-transitory machine-readable storage medium of claim 16, wherein the initiating the access to the network event locating system information comprises initiating the access to updated network event locating system information without receiving a further request from the subscriber device.

18. The non-transitory machine-readable storage medium of claim 16, wherein the initiating the access to the network event locating system information comprises enabling the access to network event locating system information for the mobile devices.

19. The non-transitory machine-readable storage medium of claim 18, wherein the mobile devices employ respective network devices of different mobile access networks.

20. The non-transitory machine-readable storage medium of claim 16, wherein the network event locating system information comprises idle-state timed fingerprint location information associated with the mobile device in an idle state.

* * * * *